United States Patent [19]
Takahashi et al.

[11] Patent Number: 4,796,217
[45] Date of Patent: Jan. 3, 1989

[54] ROUNDING UNIT FOR USE IN ARITHMETIC PROCESSING OF FLOATING POINT DATA

[75] Inventors: Toshiya Takahashi; Junichi Iwasaki, both of Tokyo, Japan

[73] Assignee: NEC Corporation, Tokyo, Japan

[21] Appl. No.: 754,102

[22] Filed: Jul. 12, 1985

[30] Foreign Application Priority Data

Jul. 12, 1984 [JP] Japan .................. 59-144691

[51] Int. Cl.[4] .............................. G06F 7/38
[52] U.S. Cl. .................... 364/745; 364/748
[58] Field of Search ................. 364/745, 748

[56] References Cited

U.S. PATENT DOCUMENTS

| | | | |
|---|---|---|---|
| 4,295,203 | 10/1981 | Joyce | 364/745 |
| 4,338,675 | 7/1982 | Palmer et al. | 364/745 |
| 4,386,413 | 5/1983 | Vignes et al. | 364/745 |
| 4,468,748 | 8/1984 | Blaw et al. | 364/745 |
| 4,484,259 | 11/1984 | Palmer et al. | 364/748 |
| 4,528,640 | 7/1985 | Criswell | 364/748 |
| 4,562,553 | 12/1985 | Mattedi et al. | 364/745 |
| 4,589,067 | 5/1986 | Porter et al. | 364/736 |

Primary Examiner—Gary V. Harkcom
Assistant Examiner—Dale M. Shaw
Attorney, Agent, or Firm—Sughrue, Mion, Zinn, Macpeak & Seas

[57] ABSTRACT

A rounding unit for use in arithmetic processing of register floating point data. The rounding unit comprises a mantissa part register for storing the mantissa part of the floating point data, an exponent part register for storing the exponent part of the floating point data, a judging circuit for judging whether the rounding operation is raising or truncating, a mantissa part incrementer for incrementing the mantissa part of the floating point data and outputting a carry signal when it is overflowed, an exponent part incrementer for incrementing the exponent part of the floating point data and a selection circuit which, in response to the carry signal from the mantissa part incrementer and the judging signal from the judging circuit, orders the mantissa part register to store a constant data of which the most significant bit is "1" and the other bits are "0", when the rounding operation is raising and the carry signal is present. For generating the constant data, a constant register or an adjusting means is employed. The rounding unit executes the rounding operation of floating point data by hardware and thus it operates at a very high speed.

20 Claims, 6 Drawing Sheets

ROUNDING UNIT FOR USE IN ARITHMETIC PROCESSING OF FLOATING POINT DATA

BACKGROUND OF THE INVENTION

The present invention relates to a rounding unit, and more particularly to a rounding unit for use in the arithmetic processing operation of floating point data.

Floating point data includes by an exponent part and a mantissa part. That is, floating point data A is represented by $M \times 2^E$ where $E$ represents the exponent part and $M$ indicates the mantissa part. When floating point data are processed by an arithmetic unit, their exponent parts and mantissa parts are in general independently processed, respectively.

In the arithmetic processing operation of floating point data, however, mantissa part data which have a data length exceeding the predetermined word length for the mantissa part are often treated. For example, in the case of the multiplication of floating point data, multiplication is conducted with the mantissa parts and possibly results in a data having a data length twice longer than the word length which is predetermined for the mantissa part. Thus, an operation for adjusting the data length of the resulted mantissa part data with the predetermined word length is required to complete the processing. Such an operation is called "rounding operation".

The computer which processes floating point data is usually equipped with a means which can temporarily store the data underflowing the least significant bit of the mantissa part. In accordance with the ordered rounding mode, the underflowing data is rounded by, for example, raising or truncating the same, to complete the arithmetic processing operation.

The rounding mode includes a rounding to a nearest value, a rounding in the negative direction, a rounding in the positive direction, and a rounding in the direction toward zero. But the rounding operation includes only two cases, that is to raise one unit to the place of the least significant bit of the mantissa part and to truncate the value underflowing the least significant bit of the mantissa part. Namely, the rounding operation can be summarized as modifying the result of the arithmetic operation by adding "1" to the least significant bit of the mantissa part or truncating the underflowing value, depending upon the mode of rounding operation and the result of the arithmetic processing.

However, there is an exception which can not be summarized as above. Such an exception is illustrated in FIG. 1. In this exceptional case, a mantissa part data, in which all of the bits are "1", is obtained as a result of the arithmetic processing, as shown in FIG. 1 (A). If such a mantissa part data is incremented by "1" by the rounding operation, the incremented data overflows the most significant bit of the mantissa part so that all of the bits in the mantissa part become "0" as shown in FIG. 1 (B). Thus an adjustment must be made to the mantissa part and to the exponent part. That is, the mantissa part must be a constant value in which the most significant bit is "1" and the other bits are "0", while the exponent part is incremented by "1" as shown in FIG. 1 (C).

Accordingly, the rounding operation must always be conducted to cover such an exception.

In the prior art, the rounding operation is conducted following to an operation flow shown in FIG. 2.

First, it should be judged whether the rounding operation is raising or truncating. If the operation is raising, the mantissa part $M_B$ is incremented by "1" and then it is also judged whether or not a carry occurs due to the increment of the mantissa part $M_B$. These operations have been conducted by a program in the prior art. But, in the case of processing a number of floating point data, checking operation of a carry signal must be conducted each time the increment operation of the mantissa part is conducted, even if the exception described above rarely occurs. Then, the period of time for the rounding operation is prolonged because of the checking of the carry signal.

Further, in case a carry occurs as a result of the increment of the mantissa part, both the mantissa part and the exponent part must be adjusted, which further prolongs the period of time for the rounding operation.

SUMMARY OF THE INVENTION

It is a main object of the present invention to resolve the above described problem of the prior art, and more particularly to execute the rounding operation at a high speed.

It is an object of the present invention to provide a rounding unit for use in arithmetic processing of floating point data, which operates at a high speed.

According to the present invention, there is provided a rounding unit for use in arithmetic processing of floating point data, comprising:

a mantissa part register for storing the mantissa part of the floating point data;

an exponent part register for storing the exponent part of the floating point data;

a judging circuit for judging whether the rounding operation is raising or truncating;

a mantissa part increment for incrementing the mantissa part of the floating point data and outputting a carry signal when it is overflowed;

an exponent part incrementer for incrementing the exponent part of the floating point data; and a selection circuit which, in response to the carry signal from the mantissa part incrementer and the judging signal from the judging circuit, orders the mantissa part register to output constant data of which the most significant bit is "1" and the other bits are "0", when the rounding operation is raising and the carry signal is present.

According to an embodiment of the present invention, the mantissa part register includes a first mantissa part register for storing the mantissa part of the floating point data before the rounding operation is conducted, a second mantissa part register for storing the mantissa part of the floating point data after the rounding operation is completed, and a constant register for storing the constant data. These registers are coupled to a mantissa part data bus.

According to a preferred embodiment of the present invention, when the rounding operation is truncating, the selection circuit orders the first mantissa part register to output the data stored therein to the mantissa part data bus and the second mantissa part register to read the data present in the mantissa part bus; when the rounding operation is raising, but the carry signal is absent, the selection circuit orders the mantissa part incrementer to output the incremented data to the mantissa part data bus and the second mantissa part register to read the data present in the mantissa part data bus; and when the rounding operation is raising and the carry signal is present, the selection circuit orders the constant register to output the constant data to the mantissa part data bus and the second mantissa part register to read the data present in the mantissa data bus.

According to another embodiment of the invention, the rounding unit further includes adjusting means connected to the mantissa part incrementer for receiving the carry signal and the incremented data, and for modifying the incremented data by adding the carry signal to the most significant bit of the incremented data. In this embodiment, the selection circuit orders the mantissa part register to read out modified data, when the rounding operation is raising.

According to a still further embodiment of the present invention, the exponent part register includes a first exponent part register for storing the exponent part of the floating point data before the rounding operation is conducted, and a second exponent part register for storing the exponent part of the floating point data after the rounding operation is completed.

Other objects and aspects of the invention will become apparent from the following description of embodiments of the invention which will be made with reference to the accompanying drawings.

DETAILED DESCRIPTION OF THE PREFERRED EMBODIMENTS OF THE INVENTION

Now, before describing the examples of the present invention, the rounding operation of the mantissa part data is illustrated in Table 1.

TABLE 1

| Rounding operation | carry due to increment of mantissa part data | Rounded mantissa part data | Rounded exponent part data |
|---|---|---|---|
| truncating | — | not changed | not changed |
| raising | 0 (carry is not conducted) | incremented by "1" | not changed |
|  | 1 (carry is conducted) | constant data [1 0 ... 0] | incremented by "1" |

As illustrated in Table 1, when the rounding operation is to truncate the value underflowing the least significant bit of the non-rounded mantissa part data $M_B$, both of the mantissa part data and the exponent part data are not changed. On the other hand, when the rounding operation is to raise a unit to the place of the least significant bit of the mantissa part, that is, to add "1" to the least significant bit of the mantissa part data, either of two different operations is to be conducted depending upon the result of the increment of the mantissa part data. That is, when a carry operation is to be conducted on the exponent part due to the increment of the mantissa part data, the mantissa data must be a constant data of "1 0 ... 0" and the exponent part data must be incremented by "1". When a carry does not occur, the mantissa part data is incremented by "1" and the exponent part data remains unchanged.

With the above in the mind, a preferred example of the present invention will be described with reference to FIG. 3.

In the first example which will be explained with reference to FIG. 3, the rounding unit is to execute rounding operation of a floating point data of 32 bit length which consists of a coding part of one bit length, a mantissa part of 24 bit length and an exponent part of 7 bit length.

Figure 1:
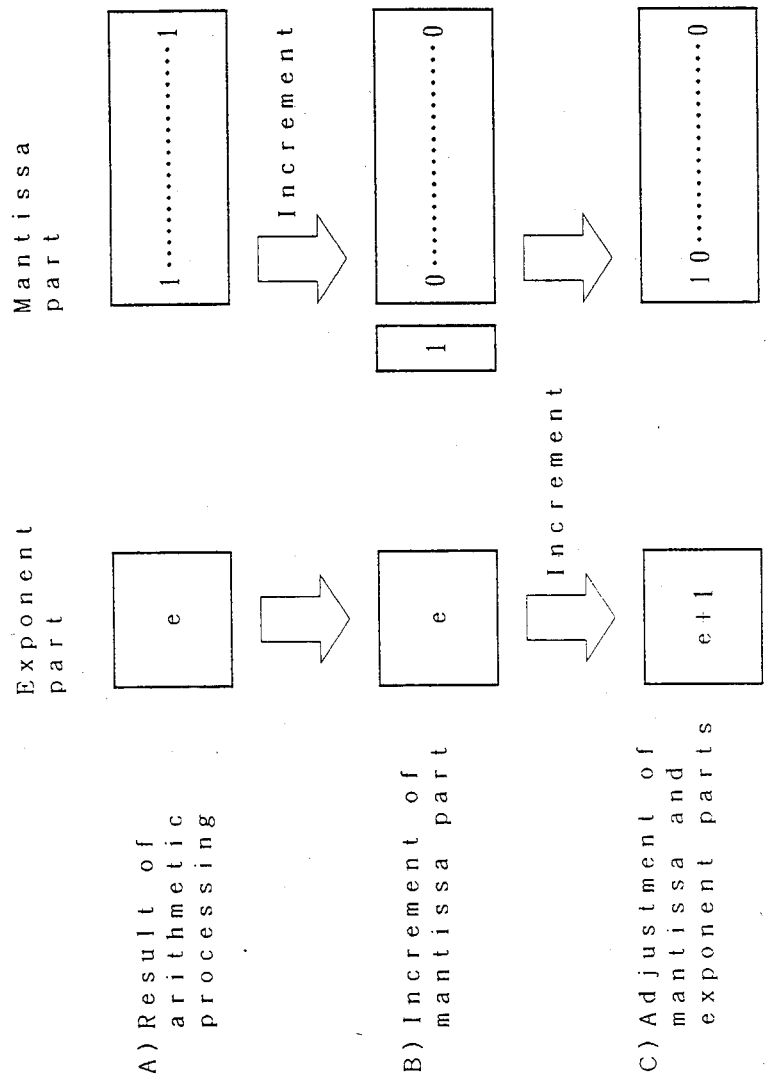
FIG. 1 illustrates an exceptional case of the rounding operation of floating point data where an adjustment must be made to the mantissa and exponent parts.
Figure 2:
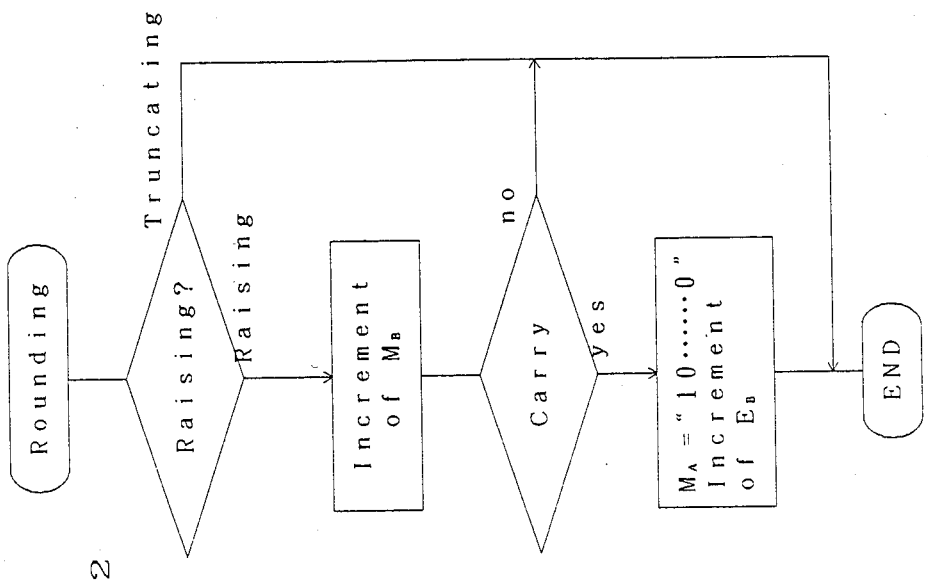
FIG. 2 shows operation flow of the rounding operation of the prior art.
Figure 3:
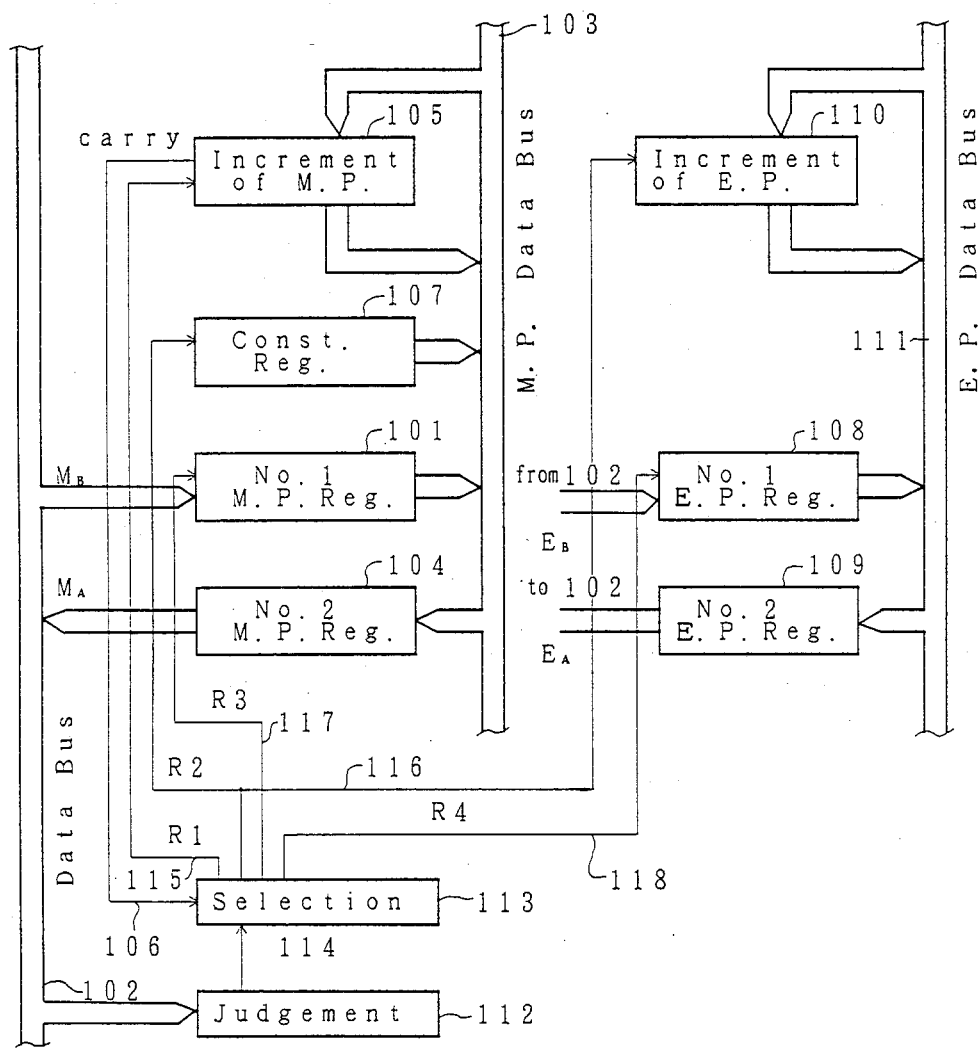
FIG. 3 is a block diagram showing a rounding unit of an example according to the present invention.

As shown in FIG. 3, a rounding unit according to the present invention includes a first mantissa part register 101 to which data $M_B$ representing the mantissa part of a floating point data before the rounding operation is executed is transferred from an arithmetic unit (not shown in the drawing) through a data bus 102. On the other hand, the first mantissa part register 101 is coupled to a mantissa part data bus 103. Thus, the first mantissa part register 101 may store data representing the 24-bit mantissa part of the floating point data before the rounding operation is executed and transfer the same to the mantissa part data bus 103.

A second mantissa part register 104 is also coupled with the mantissa part data bus 103 from which data of 24 bit length may be transferred and stored therein. The second mantissa part register 104 is for storing data $M_A$ representing the mantissa part of the floating point data after the rounding operation is completed. Thus, the second mantissa part register 104 is of 24 bit length and coupled to the data bus 102 so as to transfer the rounded mantissa part data $M_A$ to the arithmetic unit.

The rounding unit shown in FIG. 3 further includes a mantissa part incrementer 105 coupled to the mantissa part data bus 103 from which data of 24 bit length may be set therein. The mantissa part incrementer 105 increments the data by "1" and, when an overflow occurs in the increment operation, it generates a carry signal 106. The thus incremented data may be transferred to the mantissa part data bus 103.

The rounding unit further includes a constant register 107 coupled to the mantissa part data bus 103. The constant register 103 stores constant data of 24 bit length in which the most significant bit is "1" and the other bits are "0".

For performing a rounding operation on data representing the exponent part of the result of the arithmetic processing of floating point data, the rounding unit further includes a first exponent part register 108, a second exponent part register 109 and an exponent part incrementer 110. As mentioned above, the data representing the exponent part of the floating point data is 7 bits long. Then, the first and second exponent part registers 108 and 109 can store 7 bits of data. The first exponent part register 108 receives data $E_B$ representing the exponent part of the result of the arithmetic processing of floating point data before the rounding operation is executed from the arithmetic unit (not shown in the drawings), and it is also coupled to an exponent part data bus 111 so as to output the data $E_B$ to the exponent part data bus 111. On the other hand, the second exponent part register 109 is for storing data $E_A$ representing the exponent part of the floating point data after the rounding operation is completed. The second exponent part register 109 is coupled to the exponent part data bus 111 to receive the data therefrom.

The exponent part incrementer 110 is coupled to the exponent part data bus 111 to receive exponent part data therefrom and to output incremented exponent part data thereto. The exponent part incrementer is a 7-bit adder for incrementing the inputted exponent part data by "1". This is, "1" is added to the least significant bit of the exponent part data.

The rounding unit shown in FIG. 3 further includes a judging circuit 112 and a selection circuit 113. The judging circuit 112 is coupled to the data bus 102 to receive information for judging whether the rounding operation is raising or truncating. The judging circuit 112 is connected to the selection circuit 113 by a line 114 through which a judging signal is inputted to the selection circuit 112. The selection circuit 112 receives a carry signal 106 at a first input and a judging signal 114 at a second input. On the other hand, the selction circuit 113 is connected to the mantissa part incrementer 105 via a line 115 for outputting a signal $R_1$, to the constant register 107 and the exponent part incrementer 110 via a line 116 for outputting a signal $R_2$, to the first mantissa part register 101 via a line 117 for outputting a signal $R_3$ and to the first exponent part register 108 via a line 118 for outputting a signal $R_4$.

The selection circuit 113 decides to output either of the signals $R_1$, $R_2$, $R_3$ and $R_4$. The signal $R_1$ is to order to the mantissa incrementer 105 to output the incremented mantissa part data to the mantissa part data bus 103. The signal $R_2$ is to order to the constant register 107 and the exponent part incrementer 110 respectively to output the constant data to the mantissa part data bus 103 and the incremented exponent part data to the exponent part data bus 111. The signal $R_3$ is to order to the first mantissa part register 101 to output the mantissa part data $M_B$ to the mantissa part data bus 103, and the signal $R_4$ is to order to the first exponent part register 108 to output the exponent part data $E_B$ to the exponent part data bus 111.

The selection of the signals $R_1$, $R_2$, $R_3$ and $R_4$ made by the selection circuit 113 is illustrated in Table II.

TABLE II

| rounding operation | Input Carry signal of mantissa part increment | Output $R_1$ | $R_2$ | $R_3$ | $R_4$ |
|---|---|---|---|---|---|
| Truncating | 0 | 0 | 0 | 1 | 1 |
|  | 1 | 0 | 0 | 1 | 1 |
| Raising | 0 | 1 | 0 | 0 | 1 |
|  | 1 | 0 | 1 | 0 | 0 |

The operation of the rounding unit shown in FIG. 3 will be described with reference to FIG. 4 which shows a timing chart of the operation of the rounding unit.

Figure 4:
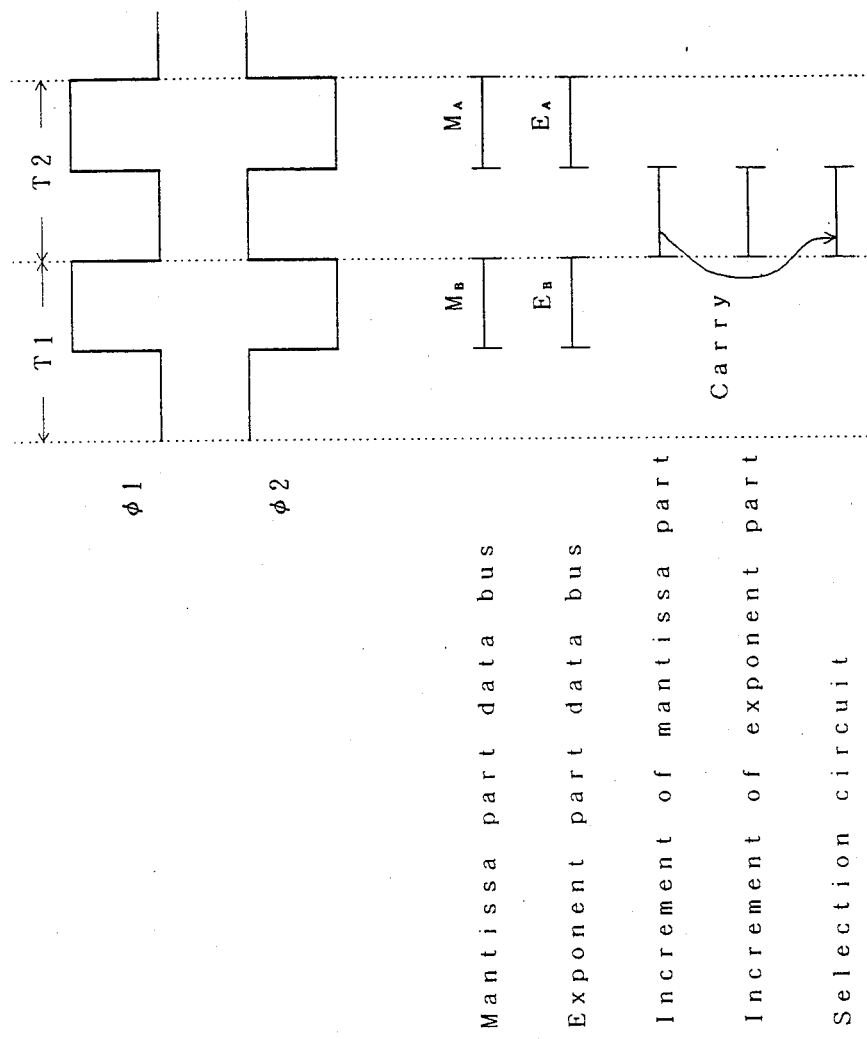
FIG. 4 is a timing chart showing an operation flow of the rounding unit shown in FIG. 3.

As shown in FIG. 4, $T_1$ and $T_2$ indicate two subsequent periodic cycles generated by a clock (not shown in the drawings) to synchronize the operation of the rounding unit. Each clock cycle is divided into two periods by pulses $\phi_1$ and $\phi_2$. Pulse $\phi_1$ is at the high level during the second half period of each clock cycle while pulse $\phi_2$ is at the high level during the first half period of each clock cycle.

First, the mantissa part $M_B$ and the exponent part $E_B$ of the result of the arithmetic processing of floating point data are respectively inputted to the first mantissa part register 101 and the first exponent part register 108 during the period $\phi_2$ of the cycle $T_1$ through the data bus 102. During a subsequent period $\phi_1$ of the cycle $T_1$, the first mantissa part register 101 and the first exponent part register 108 transfer the mantissa part data $M_B$ and the exponent part data $E_B$ respectively to the mantissa part data bus 103 and the exponent part data bus 111. Then, the mantissa part incrementer 105 and the exponent part incrementer 110 receive and latch the mantissa part data $M_B$ and the exponent part data $E_B$ respectively through the mantissa part data bus 103 and the exponent part data bus 111.

During the period $\phi_2$ of the next cycle $T_2$, increment of the mantissa and exponent parts $M_B$ and $E_B$ and the selection of the signals by the selection circuit 113 are executed. That is, the mantissa part incrementer 105 increments by "1" the mantissa part data $M_B$ on which the rounding operation has not been executed. The mantissa part incrementer 105 outputs a carry signal "1" when the increment of the mantissa part data $M_B$ overflows the most significant bit, and it outputs a signal "0" when the carry does not occur. The exponent part incrementer 110 increments by "1" the exponent part data $E_B$ on which the rounding operation has not been executed.

During the period $\phi_2$ of the cycle $T_2$, the selection circuit receives a carry signal 106 from the mantissa part incrementer 105 and a judging signal 114 from the judging circuit 112. Based on these input signals, the selection circuit 113 selects either of the signals $R_1$, $R_2$, $R_3$ and $R_4$ according to the logic illustrated in Table II.

When the judging signal indicates that the rounding operation is to truncate the value underflowing the least significant bit of the mantissa part, the selection circuit 113 selects the signals $R_3$ and $R_4$. During the period $\phi_1$ of the cycle $T_2$, the first mantissa part register 101 transfers the data $M_B$ to the second mantissa part register 104 through the mantissa part data bus 103 according to the signal $R_3$, and the first exponent part register 108 transfers the data $E_B$ to the second exponent part register 109 through the exponent part data bus 111.

When the judging signal indicates that the rounding is to raise one unit to the place of the least significant bit of the mantissa part and the carry signal 106 is absent, the selection circuit selects the signals $R_1$ and $R_4$. During the period $\phi_1$ of the cycle $T_2$, the mantissa part incrementer 105 and the first exponent part register 108 are actuated by the signals $R_1$ and $R_4$ respectively to transfer the incremented data to the mantissa part data bus 103 and transfer the exponent part data $E_B$ to the exponent part data bus 111. Then the second mantissa part register 104 and the second exponent part register 109 read the data present respectively in the mantissa part data bus 103 and the exponent part data bus 111.

When the judging signal 114 indicates that the rounding operation is to raise a unit to the place of the least significant bit of the mantissa part and the carry signal is "1", the selection circuit 113 selects the signal $R_2$ which orders the constant register 107 and the exponent part incrementer 110 to output the data to the mantissa part data bus 103 and the exponent part data bus 111, respectively. During the period $\phi_1$ of the second cycle $T_2$, the constant register 107 and the exponent part incrementer are actuated by the signals $R_1$ and $R_2$ respectively to transfer the constant data to the mantissa part data bus 103 and to transfer the incremented exponent part data to the exponent part data bus 111. Then the second mantissa part register 104 and the second exponent part register 109 read the data present respectively in the mantissa part data bus 103 and the exponent part data bus 111. That is, the rounded mantissa part data $M_A$ which is now held in the second mantissa part register 104 is constant data in which the most significant bit is "1" and the other bits are "0". The rounded exponent part data $E_A$ which is held in the second exponent part register 109 is data obtained by incrementing by "1" the exponent part data $E_B$.

As explained in detail above, the rounding operation of floating point data can be executed within two clock cycles up to the storing of the rounded data in the registers 104 and 109. Thus, the rounding operation can be conducted at a very high speed.

Then the second mantissa part register 104 and the second exponent part register 109 transfer respectively the data $M_A$ and $E_A$ to the arithmetic unit through the data bus 102.

Figure 5:
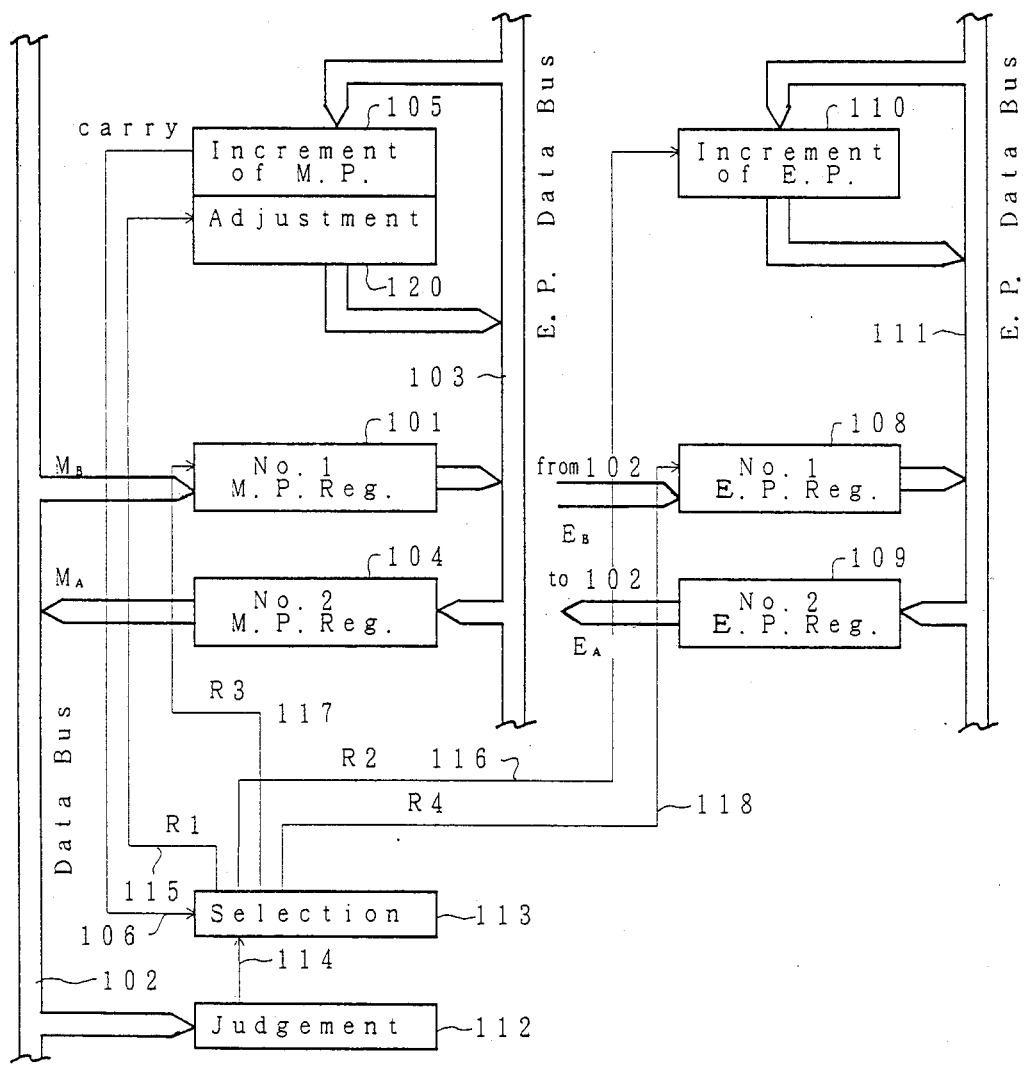
FIG. 5 a block diagram showing a rounding unit of another example according to the present invention.

The second example of the rounding unit according to the present invention will be explained with reference to FIGS. 5 and 6. The rounding unit of the present example is similar to that shown in FIG. 3 except that an adjusting means 120 is employed in lieu of the constant register 107 shown in FIG. 3 and that the logic of the selection circuit 113 is different from that of the selection circuit 113 of the rounding unit shown in FIG. 3. In FIG. 5, same numerical references are used as in FIG. 3 to indicate the same on corresponding elements.

As shown in FIG. 5, the rounding unit of the second example includes an adjusting means 120 having an input connected to the output of the mantissa part incrementer 105 and an output coupled to the mantissa part data bus 103. In this example, the output of the mantissa part incrementer 105 is not coupled with the mantissa part data bus 103.

Similar to the rounding unit shown in FIG. 3, the selection circuit 113 receives at an input the carry signal 106 from the mantissa part incrementer 105 and at another input a judging signal 114 from the judging circuit 112. But, the output of the selection circuit 113 is connected to the adjusting means 120 for outputting a signal $R_1$, to the exponent part incrementer 110 for outputting a signal $R_2$, to the first mantissa part register 101 for outputting a signal $R_3$ and to the first exponent part register 108 for outputting a signal $R_4$.

Figure 6:
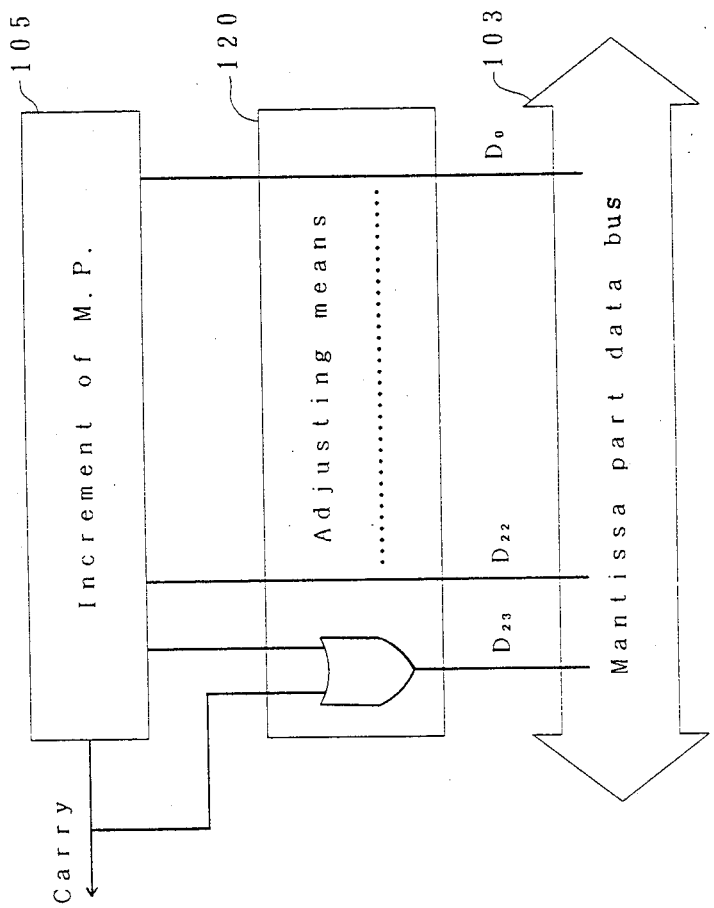
FIG. 6 shows in detail the adjusting means of the rounding unit shown in FIG. 5.

As shown in FIG. 6 which shows in detail the adjusting means 120, the adjusting means 120 is connected at an input thereof to the output of the mantissa part incrementer 105 and receives at another input thereof the carry signal 106 from the mantissa part incrementer 105. The adjusting means 120 modifies the incremented data by adding the carry signal 106 to the most significant bit of the incremented mantissa part data. That is, when the carry signal is "1" which means that a carry occurs due to the increment of the mantissa part data, the adjusting means 120 modifies the incremented data to "10 . . . 0". Thus, the mantissa part data thus modified by the adjusting means 120 becomes a constant data in which the most significant bit is "1" and the other bits are "0". On the other hand, when the carry signal is "0" which means that a carry does not occur, in fact, the adjusting means does not modify the incremented mantissa part data.

Turning to FIG. 5, the selection circuit 113 receives the carry signal 106 and the judging signal 114 and selects the signals from $R_1$, $R_2$, $R_3$ and $R_4$ according to a logic illustrated in Table III.

TABLE III

| rounding operation | Input Carry signal of mantissa part increment | Output $R_1$ | $R_2$ | $R_3$ | $R_4$ |
|---|---|---|---|---|---|
| Truncating | 0 | 0 | 0 | 1 | 1 |
|  | 1 | 0 | 0 | 1 | 1 |
| Raising | 0 | 1 | 0 | 0 | 1 |
|  | 1 | 1 | 1 | 0 | 0 |

The operation of the rounding unit shown in FIG. 5 is similar to that of the rounding unit shown in FIG. 3 except when the judging signal 114 indicates that the rounding operation is raising.

That is, when the judging signal indicates that the rounding is to raise one unit to the place of the least significant bit of the mantissa part and the carry signal 106 is absent, the selection circuit selects the signals $R_1$ and $R_4$. During the period $\phi_1$ of the cycle $T_2$, the adjusting means 120 and the first exponent part register 108 are actuated by the signals $R_1$ and $R_4$ respectively to transfer the adjusted data to the mantissa part data bus 103 and transfer the exponent part data $E_B$ to the exponent part data bus 111. As mentioned above, however, in this case, the adjusted mantissa part data remains unchanged. Thus, the mantissa part data $M_A$ stored and held in the second mantissa part register 104 is equal to the mantissa part data $M_B$ incremented by "1".

When the judging signal 114 indicates that the rounding operation is to raise a unit to the place of the least significant bit of the mantissa part and the carry signal is "1", the selection circuit 113 selects the signals $R_1$ and $R_2$ which order the adjusting means 120 and the exponent part incrementer 110 to output the data to the mantissa part data bus 103 and the exponent part data bus 110, respectively. During the period $\phi_1$ of the second cycle $T_2$, the the adjusting means 120 and the exponent part incrementer 110 are actuated by the signals $R_1$ and $R_2$ respectively to transfer the adjusted incremented data to the mantissa part data bus 103 and transfer the incremented exponent part data to the exponent part data bus 111. Then the second mantissa part register 104 and the second exponent part register 109 read the data present respectively in the mantissa part data bus 103 and the exponent part data bus 111. That is, the rounded mantissa part data $M_A$ which is now held in the second mantissa part register 104 is the adjusted incremented data, which is constant data in which the most significant bit is "1" and the other bits are "0". The rounded exponent part data $E_A$ which is held in the second exponent part register 109 is a data obtained by incrementing by "1" the exponent part data $E_B$.

As explained above, the rounding unit according to the present invention can process at a high speed floating point data of any form without checking the presence of a carry by a software. Further, the rounding unit of the present invention can be fabricated by hardware circuits which are simple in construction and thus it is very useful for high speed rounding operations on floating point data.

Although the examples are explained with the floating point data including a mantissa part of 24 bit length and an exponent part of 7 bit length, a rounding unit having a construction similar to the above examples can process floating point data of an enlarged format.

What is claimed is:

1. A rounding unit for arithmetic processing of floating point data comprisng a mantissa part and an exponent part, said unit comprising:
   a first data bus for transmitting data;
   a mantissa part data bus for transmitting the mantissa part of the floating point data;
   an exponent part data bus for transmitting the exponent part of the floating point data
   a mantissa part register, connected to said first data bus and to said mantissa part data bus, for storing the mantissa part of the floating point data;
   an exponent part register, separate from said mantissa part register and connected to said first data bus and to said exponent part data bus, for storing the exponent part of the floating point data;
   a judging circuit, connected to said first data bus, for judging whether the rounding operation is raising or truncating;
   a mantissa part incrementer, connected to said mantissa part data bus, for receiving and incrementing the mantissa part of the floating point data to provide incremented mantissa data and outputting a carry signal when it is overflowed;
   an exponent part incrementer, connected to said exponent part data bus, for receiving and incrementing the exponent part of the floating point data to provide incremented exponent data, wherein said exponent part incrementer increments the exponent part of the floating point data concurrently with incrementing of the mantissa part of the floating point data by said mantissa part incrementer; and
   a selection circuit connected to said mantissa part register, said exponent part register, said judging circuit, said mantissa part incrementer, and said exponent part incrementer, wherein, in response to the carry signal from the mantissa part incrementer and the judging signal from the judging circuit, said selection circuit orders the mantissa part register to output previously-stored constant data of which the most significant bit is "1" and the other bits are "0", when the rounding operation is raising and the carry signal is present.

2. A rounding unit as claimed in claim 1, wherein the exponent part register includes a first exponent part register for storing the exponent part of the floating point data before the rounding operation is conducted, and a second exponent part register for storing the exponent part of the floating point data after the rounding operation is completed.

3. A rounding unit as claimed in claim 2, wherein, when the carry signal is absent, the selection circuit orders the first exponent part register to output the data to the exponent part data bus and orders the second exponent part register to read the data present in the exponent part data bus, and when the carry signal is present, the selection circuit orders the exponent part incrementer to output the incremented exponent data to the exponent part data bus and orders the second exponent part register to read the data present in the exponent part data bus.

4. A rounding unit for arithmetic processing of floating point data comprising a mantissa part and an exponent part, said unit comprising:
   a first data bus for transmitting data;
   a mantissa part data bus for transmitting the mantissa part of the floating point data;
   an exponent part data bus for transmitting the exponent part of the floating point data;
   a mantissa part register, connected to said first data bus and to said mantissa part data bus, for storing the mantissa part of the floating point data, wherein the mantissa part register includes a first mantissa part register for storing the mantissa part of the floating point data before the rougind operation is conducted, a second mantissa part register for storing the mantissa part of the floating point data after the rounding operation is completed, and a constant register for storing the constant data;
   an exponent part register, connected to said first data bus and to said exponent part data bus, for storing the exponent part of the floating point data;
   a judging circuit, connected to said first data bus, for judging whether the rounding operation is raising or truncating;
   a mantissa part incrementer, connected to said mantissa part data bus, for receiving and incrementing the mantissa part of the floating point data to provide incremented mantissa data and outputting a carry signal when it is overflowed;
   an exponent part incrementer, connected to said exponent part data bus, for receiving and incrementing the exponent part of the floating point data to provide incremented exponent data; and
   a selection circuit connected to said mantissa part register, said exponent part register, said judging circuit, said mantissa part incrementer, and said exponent part incrementer, wherein, in response to the carry signal from the mantissa part incrementer and the judging signal from the judging circuit, said selection circuit orders the mantissa part register to output previously-stored constant data of which the most significant bit is "1" and the other bits are "0", when the rounding operation is raising and the carry signal is present.

5. A rounding unit as claimed in claim 4, wherein, when the rounding operation is truncating, the selection circuit orders the first mantissa part register to output the data stored therein to the mantissa part data bus and the second mantissa part register to read the data present in the mantissa part bus; when the rounding operation is raising, but the carry signal is absent, the selection circuit orders the mantissa part incrementer to output the incremented mantissa data to the mantissa part data bus and orders the second mantissa part register to read the data present in the mantissa part data bus; and when the rounding operation is raising and the carry signal is present, the selection circuit orders the constant register to output the constant data to the mantissa part data bus and orders the second mantissa part register to read the data present in the mantissa data bus.

6. A rounding unit for arithmetic processing of floating point data comprising a mantissa part and an exponent part, said unit comprising:
   a first data bus for transmitting data;
   a mantissa part data bus for transmitting the mantissa part of the floating point data;
   an exponent part data bus for transmitting the exponent part of the floating point data;
   a mantissa part register, connected to said first data bus and to said mantissa part data bus, for storing the mantissa part of the floating point data;

an exponent part register, connected to said first data bus and to said exponent part data bus, for storing the exponent part of the floating point data;

a judging circuit, connected to said first data bus, for judging whether the rounding operation is raising or truncating;

a mantissa part incrementer, connected to said mantissa part data bus, for receiving and incrementing the mantissa part of the floating point data to provide incremented mantissa data and outputting a carry signal when it is overflowed;

adjusting means, connected to the mantissa part incrementer, for receiving the carry signal and the the incremented mantissa data, and for modifying the modified mantissa data by adding "1" to the most significant bit of the incremented mantissa data when the carry signal is present, wherein said selection circuit orders the mantissa part register to read the modified data, when the rounding operation is raising and the carry signal is present;

an exponent part incrementer, connected to said exponent part data bus, for receiving and incrementing the exponent part of the floating pint data to provide incremented exponent data; and a selection circuit connected to said mantissa part register, said exponent part register, said judging circuit, said mantissa part incrementer, and said exponent part incrementer, wherein, in response to the carry signal from the mantissa part incrementer and the judging signal from the judging circuit, said selection circuit orders the mantissa part register to output previously-stored constant data of which the most significant bit is "1" and the other bits are "0", when the rounding operation is raising and the carry signal is present.

7. A rounding unit as claimed in claim 6, wherein the mantissa part register includes a first mantissa part register for storing the mantissa part of the floating point data before the rounding operation is conducted, and a second mantissa part register for storing the mantissa part of the floating point data after the rounding operation is completed.

8. A rounding unit as claimed in claim 6, wherein, when the rounding opeation is truncating, the selection circuit orders the first mantissa part register to output the data stored therein to the mantissa part data bus and orders the second mantissa part register to read the data present in the mantissa part data bus; when the rounding operation is raising, but the carry signal is absent, the selection circuit orders the mantissa part incrementer to output the incremented mantissa data to the mantissa part data bus and orders the second mantissa part register to read the data present in the mantissa part data bus; and when the rounding operation is raising and the carry signal is present, the selection circuit orders the adjusting means to output the adjusted incremented mantissa data to the mantissa part data bus and orders the second mantissa part register to read the data present in the mantissa part data bus.

9. A rounding unit as claimed in claim 7, wherein, when the rounding operation is raising, but the carry signal is absent, the incremented mantissa data is outputted as it is through the adjusting means to the mantissa part data bus.

10. A rounding unit for an arithmetic unit for processing floating point data comprising a mantissa part and an exponent part, said rounding unit comprising:

a first data bus for transmitting data;

a mantissa part data bus for transmitting the mantissa part of the floating point data;

an exponent part data bus for transmitting the exponent part of the floating point data, said arithmetic unit being connected to all of said first data bus, said mantissa part data bus, and said exponent part data bus;

a mantissa part register, connected to said first data bus and to said mantissa part data bus, for receiving from the arithmetic unit the mantissa part of the floating point data and outputting thereto the rounded mantissa part of the floating point data;

a constant register, connected to said mantissa part data bus, for storing constant data of which the most significant bit is "1" and the other bits are "0", an exponent part register, connected to said first data bus and to said exponent part data bus, for receiving from the arithmetic unit the exponent part of the floating point data and outputting thereto the rounded exponent part of the floating point data;

a judging circuit, connected to said first data bus, for judging whether the rounding operation is raising or truncating;

a mantissa part incrementer, connected to said mantissa part data bus, for receiving and incrementing the mantissa part of the floating point data to provide incremented mantissa data and outputting a carry signal when it is overflowed;

an exponent part incrementer, connected to said exponent part data bus, for receiving and incrementing the exponent part of the floating point data to provide incremented exponent data; and a selection circuit connected to said mantissa part register, said exponent part register, said constant register, said judging circuit, said mantissa part incrementer, and said exponent part incrementer, wherein, in response to the carry signal from the mantissa part incrementer and the judging signal from the judging circuit, said selection circuit orders transfer of the constant data from the constant register to the mantissa part register, when the rounding operation is raising and the carry signal is present.

11. A rounding unit as claimed in claim 10, said mantissa part register including a first mantissa part register for receiving from the arithmetic unit and storing therein the mantissa part of the floating point data before the rounding operation is conducted and a second mantissa part register for storing and outputting to the arithmetic unit the rounded mantissa part of the floating point data.

12. A rounding unit as claimed in claim 11, wherein, when the rounding operation is truncating, the selection circuit orders the first mantissa part register to output the data stored therein to the mantissa part data bus and orders the second mantissa part register to read the data present in the mantissa part data bus; when the rounding operation is raising, but the carry signal is absent, the selection circuit orders the mantissa part incrementer to output the incremented mantissa data to the mantissa part data bus and orders the second mantissa part register to read the data present in the mantissa part data bus; and when the rounding operation is raising and the carry signal is present, the selection circuit orders the constant register to output the constant data to the mantissa part data bus and orders the second mantissa part register to read the data present in the mantissa data bus.

13. A rounding unit as claimed in claim 10, wherein the exponent part register includes a first exponent part register for receiving from the arithmetic unit and storing the exponent part of the floating point data before the rounding operation is conducted, and a second exponent part register for storing and outputting to the arithmetic unit the rounded exponent part of the floating point data after the rounding operation is completed.

14. A rounding unit as claimed in claim 13, wherein, when the carry signal is absent, the selection circuit orders the first exponent part register to output the data to the exponent part data bus and orders the second exponent part register to read the data present in the exponent part data bus; and when the carry signal is present, the selection circuit orders the exponent part incrementer to output the incremented exponent data to the exponent part data bus and orders the second exponent part register to read the data present in the exponent part data bus.

15. A rounding unit for an arithmetic unit for processing floating point data comprising mantissa part data and exponent part data, said rounding unit comprising:
   a first data bus for transmitting data;
   a mantissa part data bus for transmitting the mantissa part of the floating point data;
   an exponent part data bus for transmitting the exponent part of the floating point data, said arithmetic unit being connected to all of said first data bus, said mantissa part data bus, and said exponent part data bus;
   a mantissa part register, connected to said first data bus and to said mantissa part data bus, for receiving from the arithmetic unit the mantissa part of the floating point data and outputting thereto the rounded mantissa part of the floating point data;
   an exponent part register, connected to said first data bus and to said exponent part data bus, for receiving from the arithmetic unit the exponent part of the floating point data and outputting thereto the rounded exponent part of the floating point data;
   a judging circuit, connected to said first data bus, for judging whether the rounding operation is raising or truncating;
   a mantissa part incrementer, connected to said mantissa part data bus, for incrementing the mantissa part of the floating point data and outputting a carry signal when it is overflowed;
   an adjusting means connected to the mantissa part incrementer and to said mantissa part data bus, to receive the carry signal and the incremented mantissa data, and for modifying the incremented mantissa data by adding "1" to the most significant bit of the incremented mantissa data when the carry signal is present;
   an exponent part incrementer, connected to said exponent part data bus, for receiving and incrementing the exponent part of the floating point data to provide incremented exponent data; and
   a selection circuit, connected to said mantissa part register, said exponent part register, said judging circuit, said mantissa part incrementer, said adjusting means, and said exponent part incrementer, wherein, in response to the carry signal from the mantissa part incrementer and the judging signal from the judging circuit, orders the mantissa part register to read the data modified by the adjusting means, when the rounding operation is raising and the carry signal is present.

16. A rounding unit as claimed in claim 15, said mantissa part register including a first mantissa part register for receiving from the arithmetic unit and storing therein the mantissa part of the floating point data before the rounding operation is conducted, and a second mantissa part register for storing therein and outputting to the arithmetic unit the rounded mantissa part of the floating point data.

17. A rounding unit as claimed in claim 16, wherein, when the rounding operaiton is truncating, the selection circuit orders the first mantissa part register to output the data stored therein to the mantissa part data bus and orders the second mantissa part register to read the data present in the mantissa part bus; when the rounding operation is raising, the selection circuit orders the adjusting means to output the adjusted data to the mantissa part data bus and orders the second mantissa part register to read the data present in the mantissa part data bus.

18. A rounding unit as claimed in claim 16, wherein, when the rounding operation is raising, but the carry signal is absent, the incremented mantissa data is outputted as it is through the adjusting means to the mantissa part data bus.

19. A rounding unit as claimed in claim 15, wherein the exponent part register includes a first exponent part register for receiving from the arithmetic unit and storing therein the exponent part of the floating point data before the rounding operation is conducted, and a second exponent part register for storing therein and outputting to the arithmetic unit the exponent part of the floating point data after the rounding operation is completed.

20. A rounding unit as claimed in claim 19, wherein, when the carry signal is absent, the selection circuit orders the first exponent part register to output the data to the exponent part data bus and orders the second exponent part register to read the data present in the exponent part data bus; and when the carry signal is present, the selection circuit orders the exponent part incrementer to output the incremented exponent data to the exponent part data bus and orders the second exponent part register to read the data present in the exponent part data bus.

* * * * *

UNITED STATES PATENT AND TRADEMARK OFFICE
CERTIFICATE OF CORRECTION

PATENT NO. : 4,796,217

DATED : January 3, 1989

INVENTOR(S) : Toshiya TAKAHASHI et al

It is certified that error appears in the above-identified patent and that said Letters Patent is hereby corrected as shown below:

COLUMN 5, LINE 17     Delete "selection" and insert --selection--.

COLUMN 7, LINE 26     Delete "on" and insert therefor --or--.

COLUMN 10, LINE 8     Delete "rougind" and insert therefor --rounding--.

COLUMN 11, LINE 23    Delete "pint" and insert therefor --point--.

COLUMN 11, LINE 44    Delete "opeation" and insert therefor --operation--.

Signed and Sealed this

Nineteenth Day of September, 1989

Attest:

DONALD J. QUIGG

Attesting Officer

Commissioner of Patents and Trademarks